May 17, 1960  R. M. HASTINGS  2,936,785
DOUBLE DIAPHRAGM AIR CYLINDER
Filed June 13, 1956  2 Sheets-Sheet 1
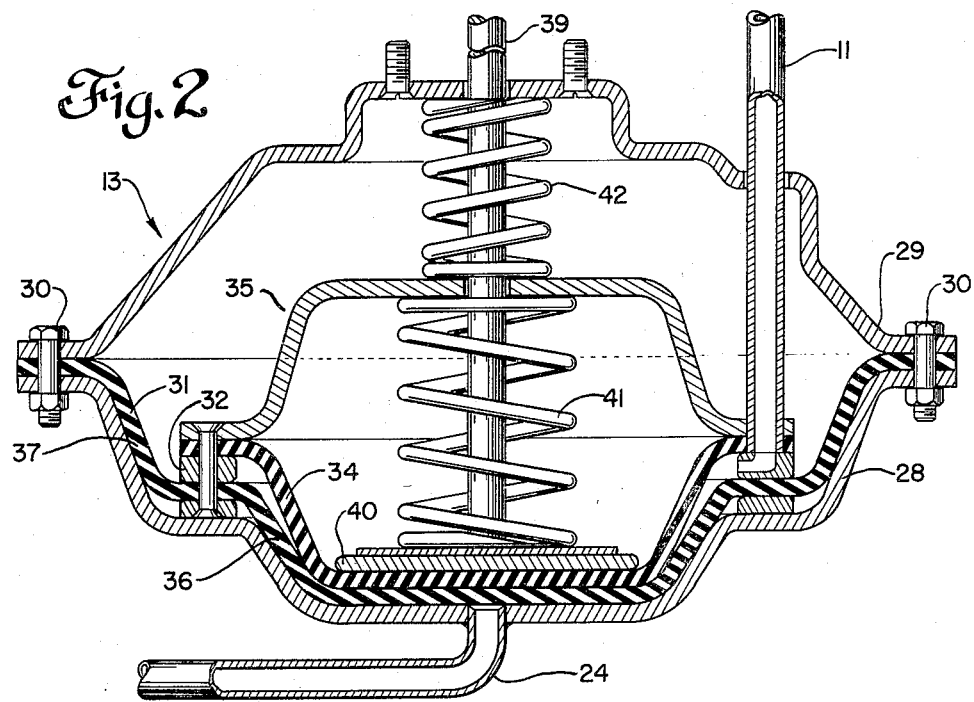
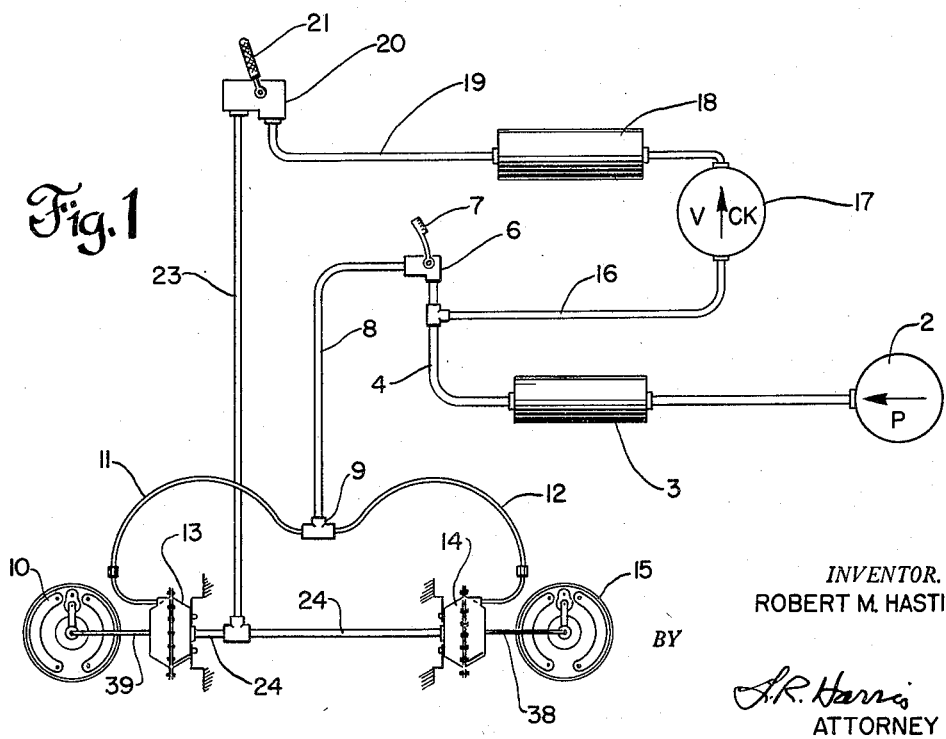
INVENTOR.
ROBERT M. HASTINGS
BY
J. R. Harris
ATTORNEY May 17, 1960 R. M. HASTINGS 2,936,785
DOUBLE DIAPHRAGM AIR CYLINDER
Filed June 13, 1956 2 Sheets-Sheet 2
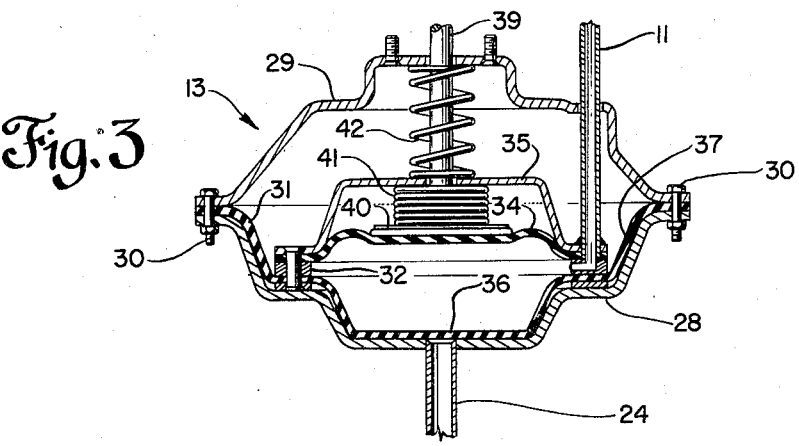
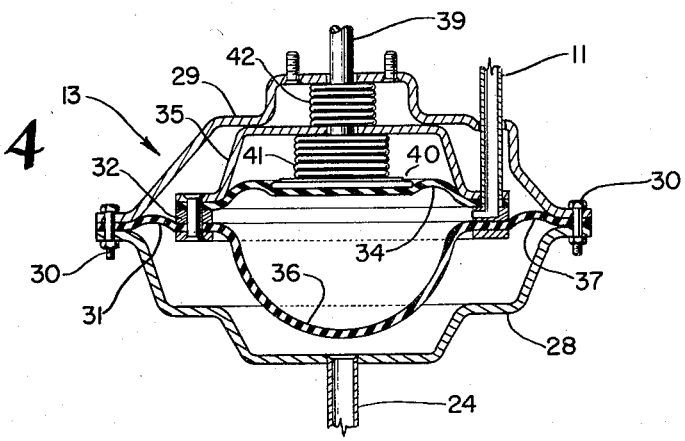
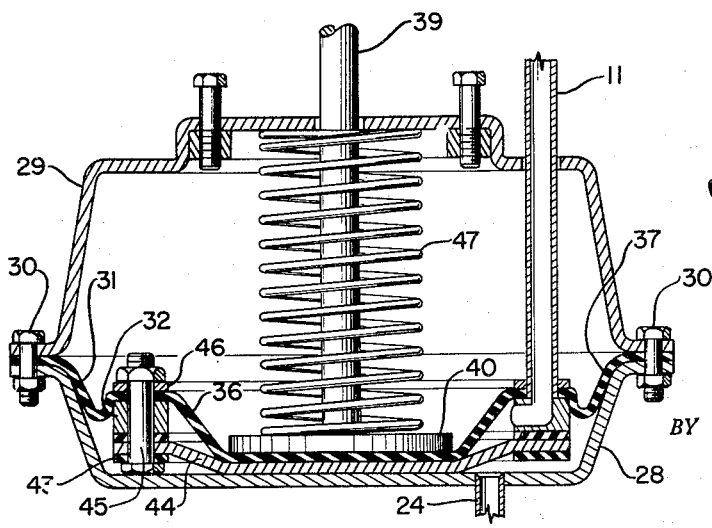
INVENTOR.
ROBERT M. HASTINGS
BY
ATTORNEY ২,936,785
Patented May 17, 1960

2,936,785

DOUBLE DIAPHRAGM AIR CYLINDER

Robert M. Hastings, Prospect, Pa., assignor to Hoppenstand Motors, Inc., Conneautville, Pa., a corporation of Pennsylvania Application June 13, 1956, Serial No. 591,102

10 Claims. (Cl. 137—780)

This invention relates to motor vehicle braking mechanisms, and is more particularly concerned with a fluid-operated brake motor which makes possible improved emergency braking.

It is conventional to equip heavy duty commercial vehicles with power operated brakes, generally fluid-operated brakes which are connected both to a foot pedal and also to a hand or emergency brake valve. A hand operated mechanical brake is also provided, operating either on the wheels or on the transmission. It would be expensive, even if possible, to make the mechanical brake of sufficient capacity to bring the vehicle to a quick, positive stop under all conditions and, therefore, the hand operated mechanical brake is in effect only a parking brake. If the power braking system is not correctly adjusted, or if the power operated brakes "fade" because of excessive demands on them, the additional braking afforded by pulling on the hand brake is frequently insufficient to stop the vehicle quickly.

It is an object of my invention, therefore, to provide a fluid-operated brake motor which may be operated both by foot pedal and hand valve and provides additional braking effect when operated by the hand valve. It is another object of my invention to provide a fluid-operated brake motor operated both by foot pedal and hand valve such that its braking effect when operated by the hand valve is not impaired by improper brake adjustment or fading of brakes. Other objects of my invention will become evident in the course of the following description thereof.

In my invention the fluid pressure which is controlled by the foot pedal energizes the brake motor in the normal manner, that is, it causes the rod moved by the diaphragm of the brake motor to travel the amount necessary to apply the vehicle brakes. When, however, the same fluid pressure is caused to energize the brake motor by the hand valve, the rod is caused to travel a further distance sufficient to make up for a considerable misadjustment or fading of the brakes.

Present preferred embodiments of my invention are illustrated in the accompanying drawings, to which reference is now made.

Fig. 1 is a diagram of the brake system of a motor vehicle embodying the brake motors of my invention.

Fig. 2 is a view in section taken through a brake motor of my invention, the position of the parts being that assumed when neither hand valve nor foot pedal is applied.

Fig. 3 is a view in section through a brake motor of my invention, the position of the parts being that assumed when the foot pedal is depressed.

Fig. 4 is a view similar to that of Fig. 3, but showing the parts of my brake motor in the position that is assumed when both hand valve and foot pedal are applied.

Fig. 5 is a view in section of a simplified form of the apparatus of my invention.

The system illustrated in Fig. 1 comprises a suitable compressor 2 which supplies fluid to a fluid pressure reservoir 3. This fluid is conventionally air, but my apparatus operates equally well with oil or other hydraulic fluid. Reservoir 3 is connected through pipe 4 to a valve 6 operated by the foot pedal 7. The valve 6 admits fluid through a pipe 8 to a quick release valve 9 which passes fluid through pipes 11 and 12 to brake motors 13 and 14, respectively. Valve 9 is of the conventional type, including a check valve that upon closing of valve 9 vents the fluid from the motors 13 and 14 to the atmosphere. A brake rod 39 extends from brake motor 13 and operates wheel brake 10. A like brake rod 38 extends from brake motor 14 and operates wheel brake 15.

A pipe 16 connects reservoir 3 through a check valve 17 to an auxiliary reservoir 18. Check valve 17 is of conventional type and is designed to close if the pressure in reservoir 3 falls off for any reason. Thus, the pressure in reservoir 18 is maintained. Fluid from reservoir 18 passes through a pipe 19 to a valve 20 operated by hand lever 21. Valve 20 opens when hand lever 21 is operated and closes when hand lever 21 is released. When valve 20 is opened, fluid is allowed to pass through pipe 23 to cross pipe 24 which is connected to brake motors 13 and 14.

Brake motor 13 is shown in detail in Fig. 2. It is enclosed in a split housing having a lower portion 28 and an upper portion 29, which may be steel stampings or pressings circular in plan bolted together through outturned flanges by bolts 30—30. Bolts 30—30 also hold between the flanges of housings 28 and 29 a flexible diaphragm 31. Affixed to diaphragm 31 is a circular ring 32 positioned concentric with housing 28 but of smaller diameter so that it is spaced therefrom. Ring 32 is affixed to diaphragm 31 on the side opposite the bottom housing 28. Affixed to ring 32 is a second flexible diaphragm 34 and this diaphragm 34 is covered with a secondary housing 35. Ring 32 divides the diaphragm 31 into a central portion which will be designated as 36 and a circumferential portion designated as 37. It will be understood that these two portions may physically be in one piece or be separate pieces and that either construction is satisfactory for my invention. Both sections 36 and 37 of diaphragm 31 are imperforate. Likewise, housing 28 is imperforate except for pipe 24. Diaphragm 34 is also imperforate. Pipe 11 through an opening in ring 32 communicates with the space between diaphragms 34 and 36, and passes upwardly out of housing 29 through an opening in the latter large enough to permit pipe 11 to move freely therethrough. Brake rod 39 extends into housings 28 and 29 on their axis through holes in housings 29 and 35 providing sufficient clearance for brake rod 39 to move readily therethrough. At its lower end brake rod 39 is attached to a circular plate 40 which is held against diaphragm 34 by a spiral compression spring 41, the upper end of which bears against the inside of housing 35. A second spiral compression spring 42 bears at one end against housing 35 and the other against housing 29 so as to urge them apart.

The embodiment of my invention illustrated in Fig. 5 is also contained in lower housing 28 and upper housing 29 held together by bolts 30, all as has previously been described. Between the flanged edges of housings 28 and 29 is also clamped a diaphragm 31 and affixed to this diaphragm is a ring 32 which is concentric with housing 28 but of a smaller diameter so that it is spaced therefrom. Ring 32, however, is affixed to the face of diaphragm 31 adjoining housing 28. The lower face of ring 32 is covered with a rigid closure member 44 which is held in place by bolts 45. A sealing ring 43 of rubber or like flexible material prevents leakage of air around bolts 45. Closure member 44 and ring 32 form a cup-shaped secondary housing which is closed off by the central portion 36 of diaphragm 31. A metal ring 46 is pulled down on diaphragm 36 by bolts 45, previously mentioned. Pipe 11 communicates with the space between plate 44 and diaphragm 36 through ring 32, and pipe 24 admits fluid through housing 28 against the under side of member 44. Brake rod 39 enters housing 29 through a clearance hole and terminates at its lower end in circular plate 40 which is held against diaphragm 36 by compression spring 47, the upper end of which presses against the top of housing 29.

I shall now describe the operation of my brake motor, again with reference to the accompanying drawings. As I have mentioned, Fig. 2 shows the apparatus of my invention in the position it assumes when neither the hand lever nor foot pedal is actuated so as to admit fluid to it. Brake rod 39 is fully withdrawn so that wheel brake 10 is released. When foot pedal 7 is depressed, fluid under pressure from reservoir 3 is admitted through pipes 8 and 11 to the space between diaphragms 34 and 36 of my brake motor and the pressure of the fluid causes diaphragm 34 to move away from diaphragm 36 until my apparatus assumes the position shown in Fig. 3. Compression spring 41 is fully compressed between circular plate 40 and housing 35 and so stops the movement of brake rod 39. Brake rod 39 has been moved the distance between diaphragms 34 and 36 and my apparatus is adjusted so that this amount of movement is sufficient to apply wheel brake 10. As I have mentioned, however, wheel brake 10 may not be properly adjusted to engage fully when brake rod 39 is moved the distance indicated in Fig. 3 or the brakes may fade because of heat expansion of the metal brake drums. For either of these reasons the brake 10 may not bring the vehicle to a stop when my brake motor is in the position shown in Fig. 3. In such case hand lever 21 is actuated, allowing fluid to flow from reservoir 18 through pipe 19 and valve 20 and pipes 23 and 24 into the bottom of my brake motor 13 in the space between housing 28 and diaphragm 36. The pressure of this fluid forces not only diaphragm 36 but also housing 35 and everything contained in it upwards until the parts arrive at the position shown in Fig. 4. Since fluid under pressure has already been admitted to diaphragms 34 and 36 through pipe 11, the pressure on both sides of diaphragm 36 is the same and it does not collapse. In Fig. 4 brake rod 39 can be seen to have traveled the distance originally existing between housing 35 and 29 in Fig. 3. Compression spring 42 is fully compressed between these housings and so stops the movement of housing 35. The additional travel of brake rod 39 is adjusted so that it is sufficient to compensate for a very appreciable failure of adjustment of wheel brake 10 or very appreciable fading. Thus when hand lever 21 is operated, my brake motor 13 throws wheel brake 10 full on.

It is also possible to operate hand lever 21 without operating foot brake pedal 7 and in that case fluid admitted through pipe 24 between housing 28 and diaphragm 36 of my brake motor 13 will again bring my apparatus into the position shown in Fig. 4, except that diaphragm 36 will be pressed tightly against diaphragm 34 since no fluid under pressure has been admitted between the two.

The simplified brake motor shown in Fig. 5 operates in substantially the same way as that of Figs. 2, 3 and 4. The position of the parts in Fig. 5 is that found when neither foot pedal 7 nor hand lever 21 has been operated. If foot pedal 7 is operated, fluid is admitted through pipe 11 into the space between diaphragm 36 and closure plate 44 and the pressure of the fluid moves diaphragm 36 upwards carrying circular plate 40 and brake rod 39 with it until they reach a position corresponding to that of like elements in Fig. 3. When hand lever 21 is operated, fluid is admitted through pipe 24 in the space between housing 28 and closure plate 44 and diaphragm 37, causing the whole internal assembly to move upward into a position corresponding to that of Fig. 4.

I claim:

1. A brake-actuating fluid-operated motor comprising a primary housing, a separate secondary housing disposed within the primary housing, a primary diaphragm attached to the primary housing and supporting the secondary housing, a secondary diaphragm positioned across the secondary housing, a brake rod disposed against the secondary diaphragm and projecting through the primary housing, means for introducing fluid under pressure into the secondary housing only so as to flex the secondary diaphragm and thereby move the brake rod, and means for introducing fluid under pressure into the primary housing only so as to flex the primary diaphragm and thereby move the secondary housing and thereby additionally move the brake rod.

2. Apparatus of claim 1 in which the primary and secondary housings are provided with stop means to limit movement of the brake rod caused by the flexing of the primary diaphragm.

3. Apparatus of claim 1 having spring means positioned between primary and secondary housings so as to urge the secondary housing toward the end of the primary housing provided with means for introducing fluid under pressure thereto.

4. Apparatus of claim 1 in which the secondary housing and brake rod are provided with stop means to limit movement of the brake rod caused by the flexing of the secondary diaphragm.

5. Apparatus of claim 1 in which the secondary housing is elongated toward the end of the primary housing through which the brake rod projects so as to engage that end of the primary housing and limit the movement of the secondary housing caused by the flexing of the primary diaphragm.

6. Apparatus of claim 1 in which the primary diaphragm is attached to the secondary housing and forms a closure therefor.

7. Apparatus of claim 1 in which the primary diaphragm is attached to the secondary housing and the secondary diaphragm is an extension of the primary diaphragm.

8. A brake-actuating fluid-operated motor comprising a primary housing having a closed end and an open end, a separate secondary housing disposed within the primary housing, a primary diaphragm attached to the primary housing intermediate its closed and opened ends and supporting the secondary housing, a secondary diaphragm positioned across the secondary housing and forming a closure therefor, a brake rod disposed against the secondary diaphragm and projecting through the open end of the primary housing, means for introducing fluid under pressure only into the primary housing through its closed end and separate means for introducing fluid under pressure only into the secondary housing.

9. Apparatus of claim 8 in which the secondary housing is open at both ends, the primary diaphragm is positioned across one end of the secondary housing and the secondary diaphragm is positioned across the other end of the secondary housing.

10. Apparatus of claim 8 in which the secondary housing has a closed end adjacent the closed end of the primary housing and an open end, and the secondary diaphragm is positioned across the open end of the secondary housing.

References Cited in the file of this patent

UNITED STATES PATENTS

| 2,465,714 | Elliott | Mar. 29, 1949 |
| 2,649,169 | Holman | Aug. 18, 1953 |
| 2,690,740 | Hupp | Oct. 5, 1954 |
| 2,770,799 | Horn | Nov. 13, 1956 |